United States Patent [19]

Fang et al.

[11] Patent Number: 5,853,684
[45] Date of Patent: Dec. 29, 1998

[54] CATALYTIC REMOVAL OF SULFUR DIOXIDE FROM FLUE GAS

[75] Inventors: Ming Fang, Clearwater Bay; Jian-Xin Ma, Tai Po Tsai Village, both of Hong Kong

[73] Assignee: The Hong Kong University of Science & Technology, Hong Kong, Hong Kong

[21] Appl. No.: 914,615

[22] Filed: Aug. 21, 1997

Related U.S. Application Data

[63] Continuation of Ser. No. 558,694, Nov. 14, 1995, abandoned.

[51] Int. Cl.⁶ ........................................................ B01J 8/00
[52] U.S. Cl. .................................. 423/244.1; 423/239.1; 423/244.02; 423/244.06; 423/244.09
[58] Field of Search ........................... 423/239.1, 244.02, 423/244.06, 244.09, 244.1

[56] References Cited

U.S. PATENT DOCUMENTS

| | | | |
|---|---|---|---|
| 3,933,979 | 1/1976 | Eisenlohr et al. | 423/239.1 |
| 3,987,146 | 10/1976 | Clay et al. | 423/239.1 |
| 4,758,545 | 7/1988 | Grimm et al. | 502/210 |
| 5,023,063 | 6/1991 | Stiles | 423/239.1 |
| 5,213,779 | 5/1993 | Kay et al. | 423/239.1 |
| 5,227,145 | 7/1993 | Kintaichi et al. | 423/239.1 |

FOREIGN PATENT DOCUMENTS

| | | | |
|---|---|---|---|
| 2735683 | 2/1979 | Germany | 423/244.1 |

OTHER PUBLICATIONS

Hibbert et al., "Flue Gas Desulphurisation: Catalytic Removal of Sulphur Dioxide by Carbon Monoxide on Sulphided $La_{1-x}Sr_xCoO_3$"; 1988 (no month) pp. 289–299 Applied Catalysis, 41.

Baglio, Joseph A; "Lanthanum Oxysulfide as a Catalyst for the Oxidation of CO and COS by $SO_2$", Mar. 1992 pp. 38–41; Industrial & Engineering Chemistry Product Research and Development; vol. 21 No. 1.

*Primary Examiner*—Michael L Lewis
*Assistant Examiner*—Thomas G. Dunn, Jr.
*Attorney, Agent, or Firm*—Burns, Doane, Swecker & Mathis, L.L.P.

[57] ABSTRACT

The present invention provides novel catalysts for the simultaneous removal of $SO_2$ and $NO_x$ from flue gases. The catalysts may be supported or unsupported, pretreated or untreated, but allow the simultaneous reduction of $SO_2$ to S and $NO_x$ to $N_2$. Elemental sulfur is a useful byproduct of the process.

20 Claims, 4 Drawing Sheets

CATALYTIC REMOVAL OF SULFUR DIOXIDE FROM FLUE GAS

This application is a continuation of application Ser. No. 08/558,694, filed Nov. 14, 1995 now abandoned.

BACKGROUND OF THE INVENTION

1. Field of the Invention

This invention relates to a single-stage process for the simultaneous, dry and catalytic conversion of sulfur dioxide and nitrogen oxides from gases produced in combustion processes into environmentally compatible products and saleable elemental sulfur.

2. Description of the Prior Art

Flue gases produced in combustion processes, such as coal-fired power plants, automobiles, smelters, etc, contain huge amounts of $NO_x$, $SO_x$, CO and particulates. They contribute significantly to atmospheric pollution and some of them are stringently controlled by legislation. $SO_x$ can combine with water vapor to form highly corrosive vapor and thus is a major contributor to acid rain; $NO_x$ is a toxic irritant which plays a major role in the formation of acid rain, urban smog, and ozone.

Over the years, a variety of processes have been developed for reducing sulfur oxide and/or nitrogen oxides emissions. Wet and dry scrubbing are among the most popular methods for removing sulfur oxides, while the selective catalytic reduction (SCR) technology is the most widely used method for removing $NO_x$ from power plants. Previous experience has shown that the best approach for the effective control of multiple pollutants is by a single, integrated system and this has been the emphasis of many researchers in recent years. Several commercially available simultaneous or combination processes were reviewed in the Handbook of Pollution Control Processes, Edited by Robert Noyes, Noyes Publications, Park Ridge, N.J., USA, 1991.

The Haldor-Topsoe's WSA-SNOX, the German DESONOX, and the Danish SNOX are similar processes using a combination of catalytic denitrification and desulfurization technology. The stack gas leaving the boiler is cleaned of fly ash in a high-efficiency fabric filter baghouse. The ash-free gas is reheated and $NO_x$ is selectively reduced by ammonia in the first of two catalytic reactors. The $SO_2$ is oxidized to $SO_3$ in a second catalytic converter which is then hydrolyzed to form concentrated sulfuric acid. These processes are multi-stage and not truly dry.

The Babcock & Wilcox Company's SOX-NOX-ROX Box (SNRB) process combines the removal of $SO_2$, $NO_x$, and particulates in one unit in the form of a high-temperature baghouse. $SO_2$ removal is accomplished using either calcium- or sodium-based sorbent injected into the flue gas. $NO_x$ removal is achieved by injecting ammonia to selectively reduce $NO_x$ to $N_2$ and $H_2O$. Particulate removal is accomplished by high-temperature ceramic fiber bag filters. This process produces solid wastes.

The NOXSO process uses alkalized alumina to adsorb $SO_2$ and $NO_x$. It is a dry and regenerable system. The NOXSO sorbent is regenerated first by heating, which causes the $NO_x$ to desorb and partially decompose. The hot air generated by the sorbent heater is recycled to the boiler where equilibrium processes cause the destruction of the desorbed $NO_x$. The sorbent is then sent to a regenerator where methane or natural gas is used to strip the sulfur off the sorbent beads. The resulting gas is processed in a Claus reactor to make elemental sulfur for resale, and the cleaned sorbent is cooled and recycled back to the adsorber. This process is multi-stage in nature: one adsorption stage and two regeneration stages, and also requires a Claus process for cleanup.

Other prior art or methods for the simultaneous control of sulfur oxide and nitrogen oxides emission can be found in patents. U.S. Pat. No. 4,251,496 to J. M. Longo and N. L. Cull describes a combination process using cerium oxide to react with $SO_2$ and the cerium oxysulfate formed is used as catalyst for reducing $NO_x$ by $NH_3$. The two reactions may be conducted in one or separate reaction zones at a temperature ranging from 500° to 700° C. Their results show that the maximum removal rates of $NO_x$ and $SO_2$ are always out of phase whether the reactions are carried out in one or multiple reaction zones. Furthermore, in order for the system to maintain the $SO_2$ absorption, some of the cerium oxysulfate formed must be continually regenerated to cerium oxide. Thus, additional processing such as the Claus process is needed to treat the off-gas from the regenerator.

U.S. Pat. Nos. 4,609,537, 4,617,175 and 4,692,318 issued to T. W. Tolpin and R. A. Kretchmer describe a process for the simultaneous removal of nitrogen oxides, sulfur oxides, and particulates in a granular-bed filter and scrubber, using a nitrogen oxide-capturing reducing agent, and a bed of sulfur oxide-capturing and particulate-removing material. However, the particulates and sulfur-containing deposits must be removed from the spent material in a regenerator. The captured sulfur oxides are converted to hydrogen sulfide in the regenerator by reacting the spent material with a reducing gas, and the hydrogen sulfide is treated in a Claus plant.

U.S. Pat. No. 5,213,779 by D. A. R. Kay, et al describes a process similar to that by Longo. However, the patent teaches that in order to optimize the removal of $NO_x$ and $SO_x$ from flue gases which also contain $O_2$, the lanthanide-oxygen-sulfur catalyst used for the dissociation of $NO_x$ is no longer capable of achieving maximum $SO_2$ removal. Therefore, it is suggested that depending on the temperature and the $SO_x$ content of the flue gas, either a lanthanide sulfate catalyst or a lanthanide-oxygen-sulfur catalyst should be used for dissociating the $NO_x$ as well as for reducing the dissociated oxygen on the active sites of the catalyst, and to use a lanthanide oxide for capturing the $SO_x$ in a separate reaction vessel. In this process, the regeneration of the spent $SO_x$ sorbent as well as the treatment of the sulfur-containing off-gas from the regenerator are also required.

None of the processes mentioned above are truly simultaneous, because they cannot convert both the $SO_x$ and $NO_x$ in flue gases into environmentally compatible products in a single reactor. The hindrance in achieving this objective in previous teachings is that a reduction reaction is usually used in the conversion of $NO_x$ to nitrogen and oxygen, while sulfur dioxide is oxidized to sulfur trioxide. The two reactions are opposite in nature making it impossible to have a truly single-stage simultaneous process.

OBJECTS OF THE INVENTION

It is, therefore, the primary object of this invention to define a completely new process for the simultaneous dry removal of both the sulfur dioxide and nitrogen oxides from exhaust gas streams in a single reaction vessel.

It is a further object of this invention to provide a novel process for the catalytic reduction of sulfur dioxide and nitrogen oxides by a reducing agent which is one of the flue gas components.

It is a further object of this invention to provide a novel process simultaneously removing sulfur dioxide and nitrogen oxides with the recovery of the sulfur in a saleable form.

It is still another object of this invention to provide unique catalyst formulations suitable for use in the processes described in this invention.

Other objects, advantages and features of the present invention will become apparent upon consideration of the following detailed disclosure.

SUMMARY OF THE INVENTION

In accordance with the invention there are provided for the first time a process and unique catalyst formulations for the simultaneous and dry removal of nitrogen oxides and sulfur dioxide from exhaust gas streams.

It has been discovered that both the nitrogen oxides and sulfur dioxide can be reduced simultaneously by an appropriate reducing gas over the same catalyst into nitrogen and high purity elemental sulfur. The overall reactions involved in the process can be written as follows:

$$2NO + 2CO = N_2 + 2CO_2 \quad (1)$$

$$2NO + 2H_2 = N_2 + 2H_2O \quad (2)$$

$$SO_2 + 2CO = S + 2CO_2 \quad (3)$$

$$SO_2 + 2H_2 = S + 2H_2O \quad (4)$$

wherein said $H_2$ can be formed from ammonia, light hydrocarbons, product of water-shift reaction, etc. Said reducing agent can also exist in the gas stream or be added externally, if desired. The process comprises passing the gas stream through a reactor at a temperature of between 300° and 800° C., preferably between 450° and 600° C., in the presence of a pretreated Ln-M-S-O catalyst system, in which Ln is at least one of the elements selected from yttrium and rare earth metals. M is at least one of the elements selected from yttrium, rare earth metals, zirconium, strontium, vanadium, chromium, molybdenum, tungsten, manganese, iron, cobalt, nickel, copper, zinc, ruthenium, rhodium, palladium, silver, and platinum S is sulfur; and O is oxygen. Preferably, Ln is lanthanum, cerium, yttrium, or combinations thereof; M is yttrium, rare earth metals, cobalt, iron, copper, nickel, molybdenum, strontium, or combinations thereof. The catalyst is pretreated by (a) the exposure of the , prepared by one of the any methods known in the art, to a flue gas stream, (b) the exposure of the oxide(s) of the selected metals to a gas containing $H_2S$, $SO_2$, $H_2$, CO, $H_2O$ or mixtures thereof, or (c) both of the methods depicted in (a) and (b). As used herein, the term "pretreated catalyst" refers to the above described catalyst pretreated in this manner. Therefore, the pretreated catalyst can be in the form of a sulfide, sulfate, oxysulfide, oxysulfate, oxide or mixture thereof.

BRIEF DESCRIPTION OF THE DRAWINGS

Some embodiments of present invention will now be described by way of example and with reference to the accompanying drawings, in which.

DETAILED DESCRIPTION OF THE INVENTION

The process of the present invention represents the first truly dry method in the area of simultaneous removal of $SO_2$ and $NO_x$ from flue gas streams. Furthermore, the present invention involves the recovery of elemental sulfur during the removal course.

Figure 1:
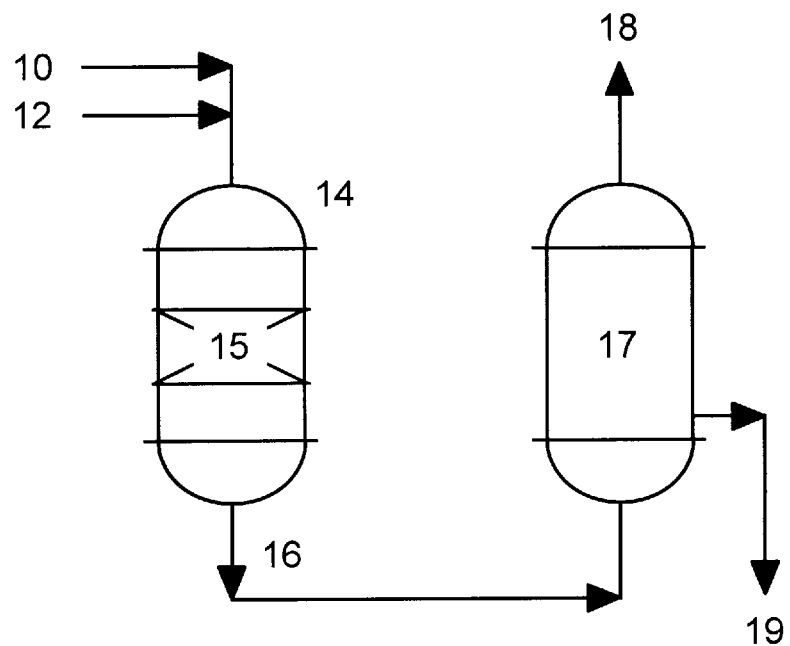
FIG. 1 is a schematic flow diagram of a system for the one-stage simultaneous removal of $SO_2$ and $NO_x$ in accordance with an embodiment of the present invention.

The preferred embodiments will be described with reference to the drawings. The FIG. 1 embodiment shows a process configuration conducted in a single stage involving a direct non-selective catalytic reduction of $SO_2$ and $NO_x$ in an off-gas stream, such as those gas streams emitted from regenerators of catalytic cracking units (especially those operated under a partial combustion mode), ore roasting, coal processing plants where coal is converted to gas and/or oil, or scrubbing systems where the absorbed sulfides are oxidized to $SO_2$ to give concentrated $SO_2$-containing gas stream, etc. Referring to FIG. 1, the exhaust gas stream 10 is introduced into a catalytic reactor 14. A reducing agent 12 is added, if desired, to the gas stream 10. The reactor contains a catalyst bed 15.

The catalyst 15 prepared in accordance with formulations disclosed in this specification is designed for simultaneous reduction of $SO_2$ and $NO_x$; it will however also work as a standalone catalyst for the conversion of either $SO_2$ or $NO_x$. The exhaust gas stream 10 may or may not contain any of the other components such as oxygen, carbon dioxide, water vapor, $H_2S$, COS, $CS_2$, and nitrogen.

The reducing agent 12, such as carbon monoxide, hydrogen, light hydrocarbons, ammonia, products of water gas shift reaction, and mixtures thereof, preferably, carbon monoxide, is added to or present in sufficient quantities in the gas stream 10 to within about ±0.2 of the stoichiometric ratio required for a complete reduction of all sulfur dioxide and nitrogen oxides according to reactions (1) to (4). Preferably said ratio should be within about ±0.1 of the stoichiometry. However, if the gas stream 10 contains other oxidants such as oxygen, additional amount of the reducing agent can be added or generated in situ to maintain the stoichiometry.

The catalyst 15 may be formulated from at least one member selected from the group consisting of yttrium and rare earth metals. The catalyst 15 may be pretreated by (a) the exposure of the oxide(s) of the selected metals prepared by one of the any methods known in the art, to a flue gas stream, (b) the exposure of the oxide(s) of the selected metals to a gas containing $H_2S$, $SO_2$, $H_2$, CO, $H_2O$ or mixtures thereof, or (c) both of the methods depicted in (a) and (b). The pretreated catalyst may exist in the form of a sulfide, sulfate, oxysulfide, oxysulfate, oxide or mixtures thereof, and may be used as such, that is unsupported, or it may be supported onto a carrier. Suitable carriers include inorganic oxides such as alumina, amorphous silica-alumina, inorganic oxides such as alumina, amorphous silica-alumina, crystalline aluminosilicate zeolites, titania, zirconia, boria, thoria, and mixtures thereof, and may also be used as a catalytic coating deposited on a ceramic monolithic substrate. The catalyst may be supported onto the carrier in any suitable manner known in the art. When the catalyst is supported on a carrier, it is generally composited with the carrier in amounts ranging from about 1 to 50 weight percent of the carrier, preferably from about 5 to 30.

The catalyst bed may be a moving bed, fixed bed, fluidized bed, ebullating bed, etc. In the embodiment shown in FIG. 1, the catalyst 15 is a monolithic honeycomb catalyst, and thus, is maintained in a fixed bed.

The reactor 14 may be operated at a temperature ranging from about 300° to 800° C., preferably at a temperature ranging from about 450° to 600° C. The pressure in the reactor 14 is not critical and may vary widely. Atmospheric pressure is suitable but higher pressures may be used, if desired. The gases are introduced into the reactor 14 at suitable gas space velocities ranging from about 200 to 100,000 volumes of gas per hour per volume of catalyst ($hr^{-1}$), preferably from about 2,000 to 30,000 $hr^{-1}$. Under these reaction conditions a conversion of higher than 98% for both $NO_x$ and $SO_2$ can be reached while the formation of side-products such as $H_2S$, COS, $CS_2$, etc. is very low.

The product gas stream 16 with the $SO_2$ and nitrogen oxides removed is passed into a sulfur recovery unit 17, for example, a steam condenser. The sulfur collected at 19 is a valuable by-product of this process. The cleaned gas stream 18 from which elemental sulfur has been removed is exhausted through stack.

Figure 2:
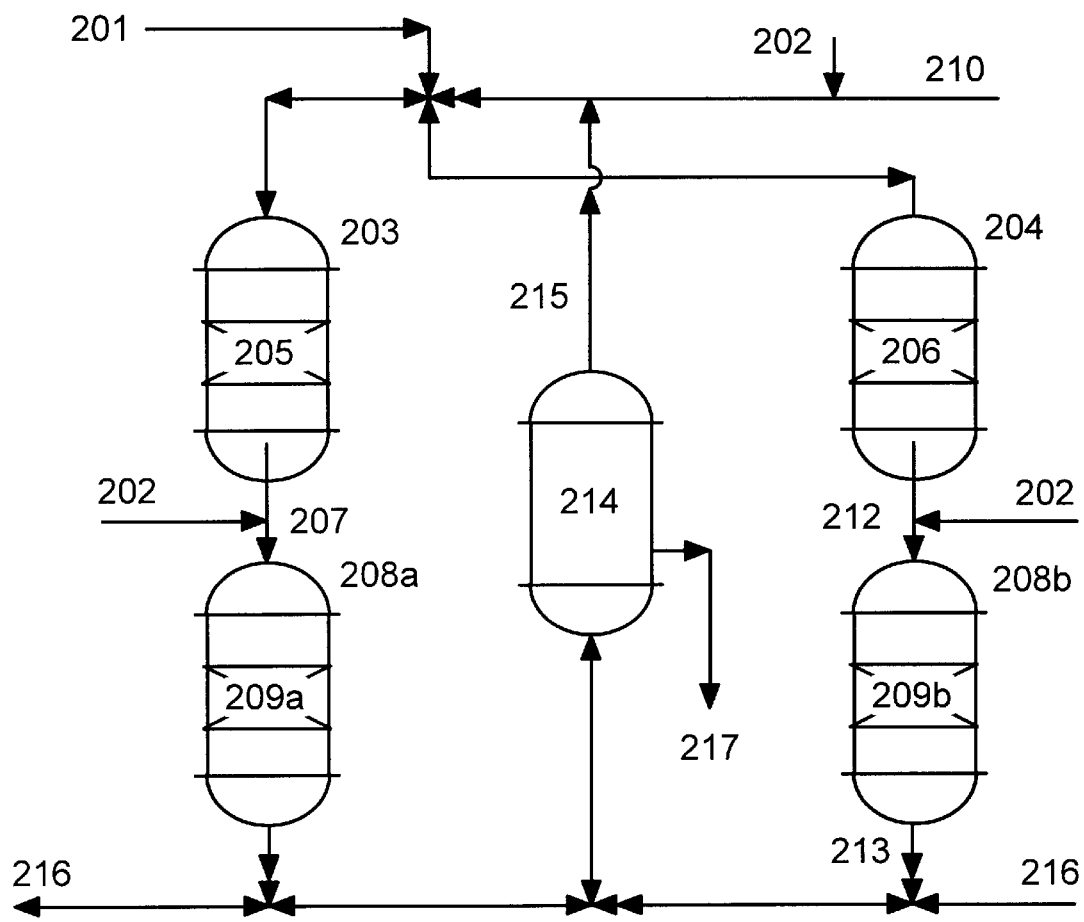
FIG. 2 is a schematic flow diagram of a system for the swing simultaneous removal of $SO_2$ and $NO_x$ in accordance with an embodiment of the present invention.

Although the FIG. 1 embodiment shows the simultaneous removal of $SO_2$ and $NO_x$ in a single reactor, the process of the present invention can be used in combination with a regenerative desulfurization process. FIG. 2 illustrates this further embodiment of the invention, in which the gas stream 201, which contains high concentrations of oxygen such as that resulting from coal-burning or oil-burning processes, is fed into absorber 203. In the absorber 203 sulfur dioxide and oxygen from the flue gas react with the sorbent 205 to form sulfate. The gas stream 207 leaving the absorber 203 is passed to the catalytic reactor 208a in which a reduction of $NO_x$ to nitrogen is catalyzed by the catalyst 209 of the present invention. The cleaned gas stream 216 from which sulfur dioxide and $NO_x$ have been removed is exhausted through stack. When the sorbent 205 is saturated, the regeneration of the sorbent by either thermal or reductive decomposition of the sulfate is needed.

The catalyst of the present invention is also well suited for recovering sulfur from regenerator off-gases and this application is illustrated on the right hand side of FIG. 2. A regenerating carrier gas 210 is introduced to the regenerator 204. If a reductive regeneration is desired the reducing gas 202 can be added to the carrier gas 210. The reducing gas 202 may be carbon monoxide, hydrogen, or mixture thereof, preferably, carbon monoxide. The regenerator off-gas stream 212 containing high concentrations of $SO_2$ as well as unreacted reducing agent is passed to the catalytic reactor 208-b in which the catalyst of the present invention 209 is filled. In reactor 208-b sulfur dioxide is reduced by the reducing agent to elemental sulfur. The reducing agent 202 may be added to the regenerator off-gas 212 if it does not have sufficient amount of the reducing agent. The resultant gas stream 213 with the $SO_2$ reduced to elemental sulfur is passed to a sulfur recovery unit 214 such as a steam condenser. The sulfur collected at 217 is a valuable by-product of this process. The gas stream 215 from which elemental sulfur has been removed can either be exhausted through a stack or recycled to the regenerating gas stream 210. The recycle operation mode is preferable because it saves carrier gas and eliminates the possible emission of unreacted $SO_2$ and the reducing agent.

The process illustrated in FIG. 2 is operated in a swing mode, ie, one part of the process is operated as a $SO_2$ removal unit while the other is operated as a regeneration unit; as a whole, $SO_2$ and $NO_x$ are removed simultaneously.

Although the process described in FIG. 2 relates to the using of a pair of vessels for the absorption of $SO_2$ and the denitrification in one and (or) for the regeneration of sorbent and the subsequent reduction of the concentrated $SO_2$ in the other, the process can be carried out using only two swing vessels: each of which contains an up-bed of sorbent and a low-bed of the catalyst of the present invention to be operated as a $deSONO_x$ reactor and as a regenerator, respectively.

The following examples are presented to illustrate the invention but should not be considered as a limitation upon the scope of the present invention.

EXAMPLE 1

3.26 g of lanthanum oxide (99.99% pure) was dissolved in diluted nitric acid and dried. The resulting lanthanum nitrate was mixed with 6.00 g of $Co(NO_3)_2.6H_2O$ (97% pure) and ground in a ball mill. The mixture of the nitrate salts was transferred to a ceramic crucible and calcined in a furnace at 750° C. for 8 hours. After cooling to room temperature, the sample was ground to pass a 200 mesh sieve and calcined again at 800° C. for 9 hours. After cooling, the sample was ground once more and re-calcined at 900° C. for 10 hours. XRD analysis showed the sample has only a single perovskite phase, ie $LaCoO_3$. The oxide was pretreated in a gas stream containing sulfur dioxide and carbon monoxide. The pretreated catalyst comprises mainly $La_2O_2S$ and $CoS_2$.

An externally heated fixed-bed reactor fabricated from a 2-cm diameter by 50-cm long quartz tube was used in the experiments described in this example. The temperature of the catalyst bed was controlled to within 1° C. and the feed gas was fed from the top of the reactor.

A gas mixture containing sulfur dioxide (5.0% v), nitric oxide (1.0% v), carbon monoxide (11.0% v) and nitrogen (83.0% v) was prepared in a gas blender. The gas mixture was diluted using nitrogen to make a feed containing 5000 ppm $SO_2$, 1000 ppm NO and 1.1% CO. The flow rate of the feed was 180 ml/min measured at atmospheric pressure.

The compositions of feed and effluent were monitored continuously using three HORIBA's non-dispersive infrared gas analyzers: a CFA-321A unit for $SO_2$ and $NO_x$, a VIA-510 unit for CO, and another for $CO_2$. In addition, a gas chromatograph with two columns and two TCD detectors was used in parallel to determine any of the side-products formed, eg COS, $H_2S$, $CS_2$ etc, as well as CO, $CO_2$, and $SO_2$ as a double check. Elemental sulfur was removed from the product gas stream by passing the gas through a sulfur trap and a filter with an average pore size of 2 μm.

Figure 3:
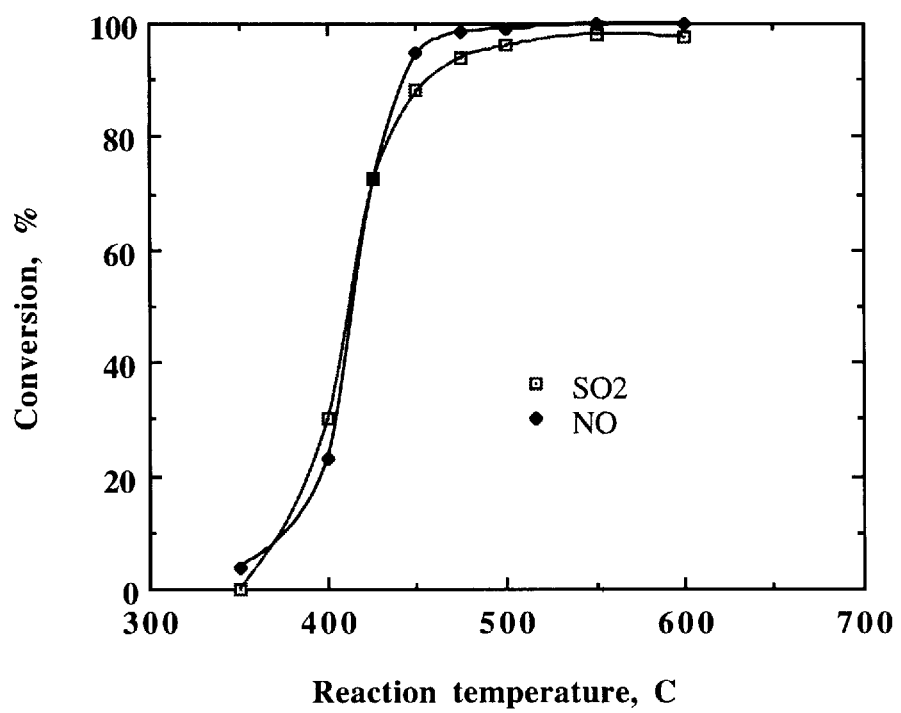
FIG. 3 is a graphical representation of the $SO_2$ and NO conversion results of Example 1.

0.5 g of the pretreated catalyst, corresponding to a space velocity of 21,600 ml/h.g-cat., was used in this example. The results are shown in FIG. 3. It can be seen that a simultaneous removal of 92% $SO_2$ and 99% NO was obtained at a temperature above 550° C., while the formation of the side-product COS was very low. The selectivity for producing elemental sulfur was 98%.

EXAMPLE 2

The procedure in Example 1 was repeated except that the oxide precursor was $La_{0.8}Sr_{0.2}CoO_3$ and the pretreated catalyst contained mainly $La_2O_2S$, $CoS_2$ and SrS.

The results are given in Table 1.

TABLE 1

| Temperature °C. | Conversion $SO_2$, % | Conversion NO, % | Concentration COS, ppm | Elemental sulfur % yield |
|---|---|---|---|---|
| 400 | 67.1 | 57.2 | 1,055 | 46.0 |
| 450 | 86.5 | 88.4 | 706 | 72.4 |
| 500 | 92.4 | 94.3 | 412 | 84.2 |
| 550 | 90.8 | 96.0 | 186 | 87.1 |
| 600 | 89.2 | 98.0 | 60 | 88.0 |

EXAMPLE 3

The procedure in Example 1 was repeated except that the oxide precursor was $LaCo_{0.8}Ru_{0.2}O_3$ and the pretreatment was carried out using a gas stream containing $SO_2$, $H_2$, CO and $CH_4$. The pretreated catalyst was found to be composed of $La_2O_2S$, $La_2(SO_4)_3$, $La_2O_2SO_4$, $CoS_2$, SrS, and $RuS_2$. The feed contained no sulfur dioxide and the results are given in Table 2.

TABLE 2

| Temperature °C. | Conversion NO, % |
|---|---|
| 450 | 56.4 |
| 500 | 82.6 |
| 550 | 94.1 |
| 600 | 96.5 |

EXAMPLE 4

From the above Examples it was discovered that the active pretreated catalysts always contained $La_2O_2S$ and $CoS_2$, as the major phases. This finding leads to the experiments studied in this example.

The procedure in Example 1 was repeated except that the catalyst was either $La_2O_2S$ or $CoS_2$. The sample of $La_2O_2S$ was prepared from lanthanum oxide using a method developed in U.S. Pat. Appln. No. 08/357,028, now abandoned in the name of the present Assignees; and the preparation of $CoS_2$ comprises the following steps: (a) mixing 2.4 g of metallic cobalt powder with 2.6 g of sulfur powder, (b) placing the mixture in a quartz ampoule and sealing under vacuum, (c) placing the sealed quartz ampoule in a protective metallic bomb and heating slowly at less than 100° C. per hour to 650° C. in a muffle oven, and (d) after holding at this temperature for two hours, the sample was cooled down to room temperature very slowly ($\leq 10°$ C. per hour). The results are presented in Table 4.

TABLE 4

Sample: $La_2O_2S$

| Temperature °C. | Conversion $SO_2$, % | Conversion NO, % | Concentration COS, ppm | Elemental sulfur % yield |
|---|---|---|---|---|
| 400 | 88.5 | — | 248 | 83.5 |
| 450 | 96.6 | 96.6 | 170 | 93.2 |
| 500 | 97.3 | 97.0 | 167 | 94.2 |
| 550 | 97.3 | 98.5 | 158 | 94.1 |
| 600 | 97.0 | 99.4 | 163 | 93.7 |

TABLE 4-continued

Sample: $CoS_2$

| Temperature °C. | Conversion $SO_2$, % | Conversion NO, % | Concentration COS, ppm | Elemental sulfur % yield |
|---|---|---|---|---|
| 400 | — | 3.2 | — | — |
| 450 | — | 6.5 | — | — |
| 500 | — | 13.5 | — | — |
| 550 | 24.0 | 64.3 | 2,475 | −25.5* |
| 600 | 6.0 | 70.8 | 1,115 | −16.3* |

*Negative values indicate that there was consumption of sulfur from the catalyst instead of production.

EXAMPLE 5

The procedure in Example 1 was repeated except that the catalyst was a mechanical mixture of $CoS_2$ in $La_2O_2S$ with a mole fraction of 0.3.

The samples of $La_2O_2S$ and $CoS_2$ were prepared as described in Example 4.

The mixed sulfide catalyst was pretreated in situ in a feed gas stream at 600° C. for 2 hours. The results are given in Table 5.

TABLE 5

| Temperature °C. | Conversion $SO_2$, % | Conversion NO, % | Concentration COS, ppm | Elemental sulfur % yield |
|---|---|---|---|---|
| 400 | 30.4 | 22.8 | 1,595 | −1.5 |
| 450 | 87.9 | 94.6 | 135 | 85.2 |
| 500 | 96.6 | 100 | 134 | 93.9 |
| 550 | 98.3 | 100 | 155 | 95.2 |
| 600 | 97.4 | 100 | 145 | 94.5 |

EXAMPLE 6

This example demonstrates the performance of a supported catalyst in monolithic form similar to that used in the SCR process.

The primary carrier used in this example was a commercial monolithic ceramic substrate having 400 cells per square inch (cpsi) and was machined to fit the reactor.

The ceramic substrate was immersed in a solution of aluminum isoproponate for 0.5 to 3 hours at room temperature to form a washcoat. The coated substrate was then hydrolyzed and dried at 100° to 120° C. for 2 to 4 hours, and calcined at 300° to 800° C. for 2 to 10 hours. The calcining process produced a $\gamma$-$Al_2O_3$ washcoat with high specific surface areas (50–200 $m^2/g$).

The substrate with its $\gamma$-$Al_2O_3$ washcoat was then impregnated with a solution containing lanthanum nitrate. The impregnated substrate was dried at 100° to 120° C. for 2 to 4 hours. After drying, the substrate was calcined at 300° to 750° C. for 2 to 8 hours. The calcining produced a catalyzed washcoat containing a lanthanum oxide layer. The weight ratio of the catalyzed washcoat to the ceramic substrate was about 0.3. The lanthanum oxide was converted to $La_2O_2S$ by the method described in Example 4. The results are presented in Table 6.

TABLE 6

Sample size: 1.4 cm diameter by 3 cm long; SV = 2,340 h$^{-1}$

| Temperature °C. | Conversion SO$_2$, % | Concentration COS, ppm | Elemental sulfur % yield |
|---|---|---|---|
| 600 | 98.4 | 146 | 95.5 |

Sample size: 1.4 cm diameter by 1 cm long; SV =0 7,015 h$^{-1}$

| Temperature °C. | Conversion SO$_2$, % | Conversion NO, % | Concentration COS, ppm | Elemental sulfur % yield |
|---|---|---|---|---|
| 500 | 81.0 | 93.0 | 352 | 74.0 |
| 550 | 95.5 | 99.5 | 374 | 88.0 |
| 600 | 98.0 | 100 | 295 | 92.1 |

Optional metal salts may be used or added to the solution to achieve other embodiments of the catalyzed washcoat that contain oxides other than those used in the present example, more specifically, any salts from the group consisting of Al$_2$O$_3$, TiO$_2$, rare earth oxides, transition metal oxides may be used.

EXAMPLE 7

Figure 4:
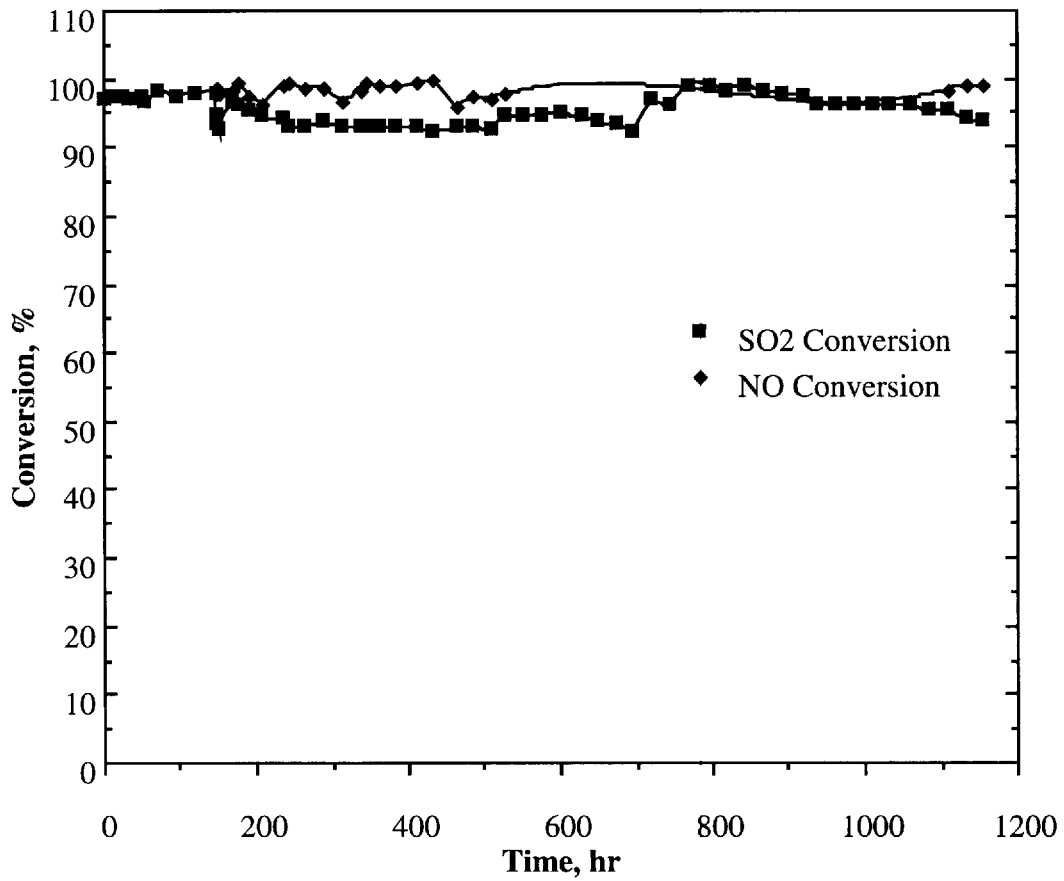
FIG. 4 is a graphical representation of the life test results of Example 7.

1.0 ml of La$_2$O$_2$S pellets (20–40 mesh, sample weight: 1.36 g) was used in this example for life test. The following reaction conditions were used: feed composition: 0.5% v SO$_2$, 1,000 ppmv NO, 1.1% v CO and 98.3% v nitrogen; space velocity: 33,000 h$^{-1}$; and temperature: 450° to 600° C. The results are plotted in FIG. 4. It is evident that there was no change in the catalytic activity after about 1,200 hours of simultaneous desulfurization and denitrification.

We claim:

1. A single-stage process for the simultaneous removal of SO$_2$ and NO$_x$ from a gas stream comprising the steps of:
   (a) passing said gas stream through a catalytic reactor containing an La$_2$O$_2$S containing catalyst bed;
   (b) introducing a reducing gas stream into said catalytic reactor, wherein said reducing gas is selected from the group consisting of carbon monoxide, hydrogen, light hydrocarbons, ammonia, and mixtures thereof;
   (c) reacting sulfur dioxide and nitrogen oxide containing gas stream with said reducing gas in the presence of said La$_2$O$_2$S containing catalyst to produce elemental sulfur and nitrogen;
   (d) removing said elemental sulfur from said reaction gas stream; and
   (e) feeding said reaction gas stream from which sulfur has been removed to a stack.

2. A process according to claim 1 wherein said La$_2$O$_2$S containing catalyst further comprises another metal sulfide, metal sulfate, or metal oxide.

3. A process according to claim 1 wherein said La$_2$O$_2$S containing catalyst is a pretreated catalyst obtained by (a) the exposure of a lanthanum oxide containing material to a flue gas stream, and/or (b) the exposure of a lanthanum oxide containing material to a gas containing H$_2$S, SO$_2$, H$_2$, CO, H$_2$O or mixtures a mixture thereof.

4. A process according to claim 3 wherein said La$_2$O$_2$S containing pretreated catalyst further comprises a sulfide or sulfate selected from the group consisting of CoS$_2$, SrS, La$_2$(SO$_4$)$_3$, La$_2$O$_2$SO$_4$ and RuS$_2$.

5. A process according to claim 3 wherein said pretreatment is carried out at a temperature ranging from 400° to 1000° C.

6. A process according to claim 5 wherein said pretreatment is carried out at a temperature ranging from 450° to 750° C.

7. A process according to claim 3 wherein said pretreatment is conducted in situ in said reactor.

8. A process according to claim 3 wherein said pretreatment is conducted outside said reactor.

9. A process according to claim 1 wherein said catalyst is used as is unsupported.

10. A process according to claim 1 wherein said catalyst is supported on a carrier.

11. A process according to claim 10 wherein said carrier includes inorganic oxides selected from the group consisting of alumina, amorphous silica-alumina, crystalline aluminosilicate zeolites, titania, zirconia, boria, thoria, and mixtures thereof.

12. A process according to claim 10 wherein said catalyst is supported on the carrier in amounts ranging from about 1 to 50 weight percent of the carrier.

13. A process according to claim 12 wherein said catalyst is supported on the carrier in amounts ranging from about 5 to 30 weight percent of the carrier.

14. A process according to claim 1 wherein said reducing gas is a component of said exhaust gas stream.

15. A process according to claim 1 wherein said reducing gas is added externally.

16. A process according to claim 1 wherein said reaction temperature of said catalyst bed is between 300° and 800° C.

17. A process according to claim 16 wherein said temperature is between 450° and 600° C.

18. A process according to claim 1 wherein the gas space velocity passed through said catalyst bed is between 200 and 100,000 h$^{-1}$.

19. A process according to claim 18 wherein said gas space velocity is between 2000 and 50,000 h$^{-1}$.

20. A process for the simultaneous removal of SO$_2$ and nitrogen oxides from a gas stream comprising a combination of the process in claim 1 with a regenerative sorbent desulfurization process.

* * * * *